Aug. 27, 1968  H. RÜTER  3,398,927
AUTOMATIC FILLING VALVE FOR POULTRY WATERING
TROUGHS AND THE LIKE
Filed Dec. 18, 1964
FIG. 1
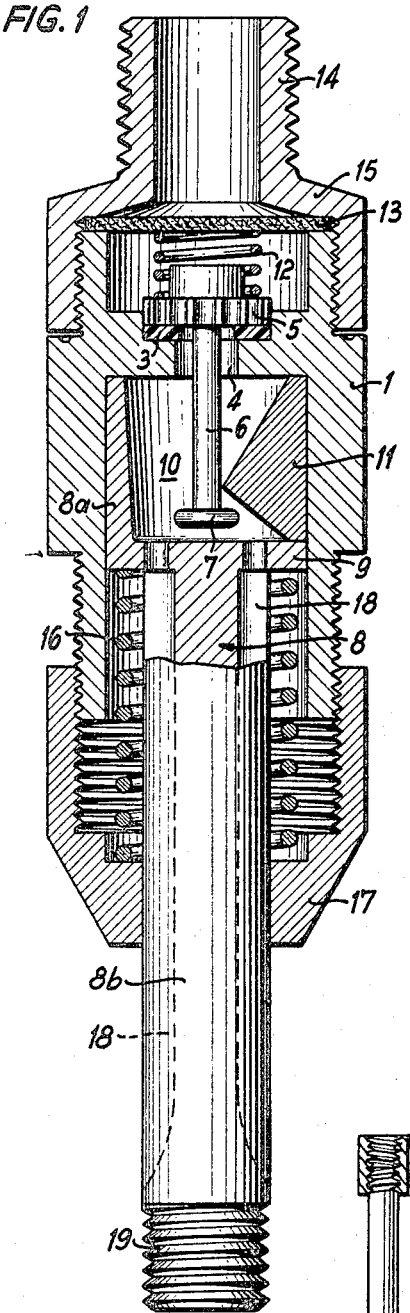
FIG. 2
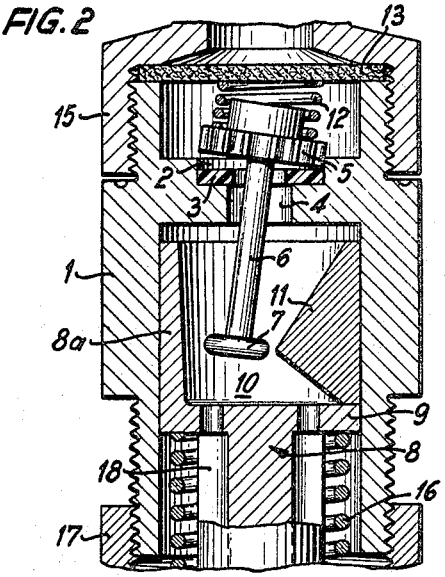
FIG. 3
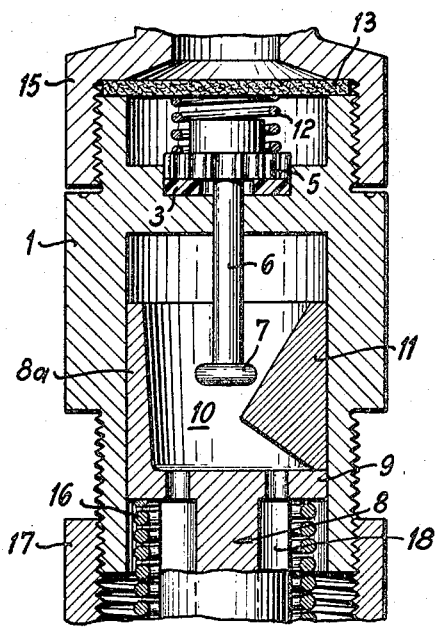
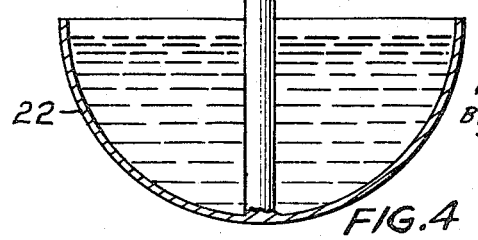
FIG. 4
INVENTOR
HANS RÜTER
BY Jacob L. Kollin
ATTORNEY United States Patent Office 3,398,927
Patented Aug. 27, 1968

3,398,927
AUTOMATIC FILLING VALVE FOR POULTRY
WATERING TROUGHS AND THE LIKE
Hans Rüter, Breitendyk 109, Krefeld, Germany
Filed Dec. 18, 1964, Ser. No. 419,335
Claims priority, application Germany, Dec. 20, 1963,
R 36,850
5 Claims. (Cl. 251—228)

ABSTRACT OF THE DISCLOSURE

A valve housing is provided with a tiltable disc valve normally held in closed position by a coil spring. The valve stem has a bead at its free end. A hollow piston plunger has an inwardly extending cam. The plunger is actuated by a spiral spring when the water level in the container becomes low. The plunger and the cam, thereby move into engagement with the bead on the valve stem and tilt the valve to an open position, thus permitting water to flow through the valve into the container.

---

The invention relates to an automatic filling valve for poultry watering troughs and in general for containers with irregular liquid discharge in which a liquid level must be properly maintained. To effect this purpose the filling valve must open automatically when the liquid level reaches below an adjustable height and must close at this height when the water level rises again.

In most known filling valves of the type which are weighted down by the weight of the container and the liquid fill, the weight is equalized by a strong spring which counteracts this weight load. There are also provided safety valves which close automatically when their weight load is substantially reduced or when the liquid container secured to the valves is broken off.

In the known fill-up valve of the last-mentioned construction a design which has proved itself particularly useful has been one in which the valve member which is under the influence of a valve spring is brought into the open position and vice versa by means of a plunger displaceably mounted in the valve housing. In this instance the plunger is indirectly connected with the liquid container by spring loaded intermediate members in the form of lever rods, a gear drive or the like. Due to the fact that such intermediate members are located exteriorly of the valve housing, they can be easily damaged or broken off and are covered gradually with dust and various small foreign bodies. In addition, they require a prohibitively large space.

The object of the invention is to provide an automatic pressure valve of particularly sturdy and useful construction in which this plunger is directly secured to the liquid container, and in which there are no interfering connecting members between the container and the plunger, such as are used in known constructions. This problem is solved substantially by providing the tiltable disc of the valve with a rod-like insert and, near the plunger extending into the valve housing, a control cam for bringing the disc valve into a tilted position for opening the valve and, during further displacement of the plunger, for bringing it again into a closed position over its seat by means of the control cam during a corresponding longitudinal displacement of the plunger in the valve housing.

The liquid container, for example, a trough for poultry may be connected directly to this plunger when the plunger in a vertical fill-up valve extends downwardly from the valve housing.

Advantageously the rod-shaped projection of the valve disc which extends into an opening provided in the valve seat extends into a pot-like recess of the plunger's head.

The control cam of the plunger extends in this recess from one side in such a manner, that during the corresponding longitudinal displacement of the plunger in the valve housing it displaces the rod-like projection and therewith the disc itself into a tilted free position in the valve opening and, during further longitudinal displacement, is out of contact with the rod-like projection.

Further details of the invention are illustrated in the accompanying drawing showing an embodiment of the invention.

In the drawing:

FIG. 1 is a longitudinal section through the fill-up valve for poultry watering troughs, a load-free plunger and FIGS. 2 and 3 illustrate the displaceable valve parts in various operating positions.

FIGURE 4 illustrates the container designed to be attached to the plunger shaft.

The substantially cylindrical housing 1 of the fill-up-valve is provided with a fixed valve seat 2 with an inserted seal ring 3 and a central opening 4. A valve disc 5 is tiltably disposed on the valve seat 2, said disc being provided on its underside with a rod-shaped projection 6, extending through the opening 4 with a bead 7 provided on its free end. Underneath the opening 4, there is disposed a plunger 8, which cooperates with the valve disc 5, the head of which 8a is guided like a piston in the valve housing 1 and extends into the slender plunger shaft 8b with its horizontal bead 9.

A pot-like recess 10 is provided in the plunger head 8a, into which extends downwardly the rod-shaped extension 6 of the valve disc 5 and laterally a roof-shaped control cam 11.

A valve spring 12, which tends to hold the valve disc 5 in closed position on the valve seat 2 or the sealing ring 3 (FIGS. 1 and 3), is disposed against a filter sieve 13 which is clamped with its head between the valve housing 1 and a cover cap 15 screwed thereon and provided with a pipe connection 14. The valve is connected in a substantially vertical position to a liquid supply by means of the pipe connection 14 and as long as the plunger 8 is loaded it remains in the closed position shown in FIG. 1. The plunger 8 is disposed and its ring 9 with its head 8a on a spiral spring 16 which surrounds the plunger shaft 8b and which bears with its lower end against its bottom cap 17. The bottom cap 17, on which bears the plunger shaft 8b, can be screwed a shorter or longer distance to the housing 1, from below against the tension of the spring 16. The pot-shaped recess 10 in the plunger head 8 extends downwardly in the longitudinal grooves 18 of the plunger shaft equally spaced on the end of the shaft. The support cap 20 of a watering trough may be screwed to the free end of the plunger shaft 8b, which is provided with a screw head 19 and extends downwardly from the housing 1 thereby loading the plunger 8 against the action of the spring 16 by the weight of the watering trough 22 including its liquid content.

The normal weight load of the plunger 8 can be fully equalized in each case according to the amount of tension of spring 16 by the bottom cap 17. With such normal load and with a watering trough which is filled to a certain height, the plunger 8 assumes the position shown in FIG. 3. In this position of the plunger the control cam 11 remains out of contact with the extension 6 of the round disc 5, which is accordingly disposed in a sealing manner on the ring 3 and closes the valve opening 4 under the influence of the valve spring 12.

The lower the liquid level becomes on the watering trough, the smaller becomes the weight load on the plunger and the plunger keeps rising under the influence of the spiral spring 16. At the same time the control cam 11 comes in contact with the bead 7 of the valve extension 6 and presses this extension to the left, as shown in FIG. 2, whereby the valve disc 5 is tilted correspondingly and the valve opening 4 is opened. Should the liquid flow passing through the valve opening 4 into the recess 10 of the plunger 8 and thence into the grooves 18 of the plunger shaft 8a and downwardly into the watering trough increase the weight load of the plunger 8, then it will move down into its normal position (FIG. 3), in which the fill-up valve is closed.

Should a large reduction of the weight on plunger 8 take place, e.g. should the watering trough secured to the plunger be broken off, then the plunger will rise into its upper end position, as shown in FIG. 1. In such a case the control cam 11 will again be out of contact with the extension 6 after it has pressed for a short time the extension valve disc to one side and thereby brought the valve disc 5 into an open position. As a result, the valve spring 12 will press the disc 5 lightly against the valve seat 2, so that, even in this exceptional case, complete security will be provided, due to the automatic closing of the fill-up valve.

The control cam 11 of the plunger 8 need not necessarily be designed in a roof-like form or shape, as shown in the drawing. It must only have, on both sides of an apex, a flat or curved diagonal surface, so that, both with the normal or very light weight load on the plunger 8, it will remain out of contact with the bead 7 of the ring-shaped valve disc extension 6. Obviously the control cam 11 must extend with its apex into the recess 10 laterally to such an extent that it will be capable of displacing the valve disc 5 into a tilted position which would effect the opening of the valve when the cam slides longitudinally past and over the bead 7.

The extension 6 of the valve disc 5 may be provided with a pressure roller or the like, instead of the bead 7. Furthermore, in a particular case, a pressure roll may be inserted in the apex of the control cam 11, in order to substitute a rolling friction for the sliding friction between the control cam 11 and the extension 6 of the valve disc 5.

I claim:

1. Automatic fill-up valve for poultry watering troughs and the like, comprising a vertically disposed cylindrical housing having a top inlet means and bottom outlet means, a perforated valve seat disposed intermediate said means and dividing said housing into upper and lower chambers, a hollow piston axially slidable in said lower chamber, said piston having an open end directed towards said valve seat and a perforated closed end, a plunger secured to said piston and extending downwardly of said lower chamber through said bottom outlet means, the wall of said plunger being spaced from said outlet means to permit the passage of liquid therethrough, a valve disc tiltably displaceable in said valve seat, a rod secured centrally to said disc and extending through said valve seat into said lower chamber, said rod's free end being formed with a projecting circular bead, a cam member provided on the inner wall of said piston, said cam member having an apex portion extending in the path of travel of said bead, whereby said valve is tilted when said apex portion trips said bead, first spring means in said upper chamber for holding said valve disc in closing contact with said seat, second spring means in said lower chamber for normally maintaining said piston's open end in contact with the under side of said valve seat and threaded means for securing the free end of said plunger to a liquid inlet cap of a container.

2. The device according to claim 1, wherein said plunger is formed with longitudinal grooves to permit the passage of liquid between said outlet means and said plunger.

3. The device according to claim 1, wherein both said spring means are spiral springs.

4. The device according to claim 1, wherein said inlet and outlet means include perforated cover caps to the respective ends of said housing.

5. The device according to claim 3, further provided with a filter sieve disposed between said upper chamber's end and its respective cap, said spring in said upper chamber being mounted between said sieve and said valve disc.

References Cited

UNITED STATES PATENTS

| | | | |
|---|---|---|---|
| 2,336,120 | 12/1943 | Null | 119—81 |
| 2,472,387 | 6/1949 | Shepherd | 119—81 |
| 2,714,390 | 8/1955 | Goff | 119—81 X |
| 2,716,423 | 8/1955 | Landgraf | 137—408 |

WILLIAM F. O'DEA, *Primary Examiner.*

D. R. MATTHEWS, *Assistant Examiner.*